United States Patent
Kurita

(10) Patent No.: US 10,674,023 B2
(45) Date of Patent: Jun. 2, 2020

(54) IMAGE FORMING APPARATUS INCLUDING AN OPERATION APPARATUS WITH A BUTTON DISPOSED ON THE SIDE

(71) Applicant: CANON KABUSHIKI KAISHA, Tokyo (JP)

(72) Inventor: Shigeharu Kurita, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 61 days.

(21) Appl. No.: 15/222,474

(22) Filed: Jul. 28, 2016

(65) Prior Publication Data

US 2017/0034370 A1  Feb. 2, 2017

(30) Foreign Application Priority Data

Jul. 30, 2015 (JP) ................. 2015-151200
Jul. 30, 2015 (JP) ................. 2015-151201

(51) Int. Cl.
*H04N 1/00* (2006.01)
*G03G 15/00* (2006.01)

(52) U.S. Cl.
CPC ..... *H04N 1/00384* (2013.01); *G03G 15/5016* (2013.01); *H04N 1/00392* (2013.01); *H04N 2201/0094* (2013.01)

(58) Field of Classification Search
CPC ................................................ H04N 1/00384
See application file for complete search history.

(56) References Cited

U.S. PATENT DOCUMENTS

2006/0171734 A1* 8/2006 Maeda ............... G03G 15/5016
399/81
2007/0187218 A1* 8/2007 Chen ...................... H01H 21/24
200/296
2013/0154939 A1* 6/2013 Miyagawa ........... H01H 13/807
345/168
2013/0194631 A1* 8/2013 Anezaki ............... H04N 1/0035
358/1.15
2014/0001952 A1* 1/2014 Harris .................... H05B 47/18
315/51
2014/0058859 A1* 2/2014 Alexander ............. G06Q 20/20
705/17
2014/0135071 A1* 5/2014 Lee ..................... H04M 1/0266
455/566
2015/0241916 A1* 8/2015 Choi ...................... G06F 1/163
361/679.03
2016/0147359 A1* 5/2016 Helmes .................. A63F 13/23
345/173
2017/0060062 A1* 3/2017 Araishi .............. G03G 15/5016

FOREIGN PATENT DOCUMENTS

| JP | H09-269860 A | 10/1997 |
| JP | 2004-031157 A | 1/2004 |
| JP | 03097543 U | 1/2004 |
| JP | 2004-050702 A | 2/2004 |
| JP | 2006-054120 A | 2/2006 |
| JP | 2007-157644 A | 6/2007 |
| JP | 2013-251591 A | 12/2013 |

* cited by examiner

*Primary Examiner* — Benjamin O Dulaney
(74) *Attorney, Agent, or Firm* — Canon U.S.A. Inc., IP Division

(57) ABSTRACT

A single stage side key disposed on a side surface of an operation unit, which is configured to control an image forming apparatus, includes an arm on the rear of an operation surface of the single stage side key (in a direction perpendicular to the operation surface). This configuration enables the operation unit to have a small thickness.

8 Claims, 14 Drawing Sheets

IMAGE FORMING APPARATUS INCLUDING AN OPERATION APPARATUS WITH A BUTTON DISPOSED ON THE SIDE

BACKGROUND OF THE INVENTION

Field of the Invention

The present invention relates to an operation apparatus including a push button, which is to be mounted in an image forming apparatus such as a copier, printer, and facsimile, and an image forming apparatus including the operation apparatus.

Description of the Related Art

Image forming apparatuses such as a copier, printer, and facsimile each typically include an operation panel on an operation surface of a main body. The operation panel includes a display configured to display an operational state of the image forming apparatus. In addition to the display, the operation panel includes an input display allowing an operator to directly enter a command therethrough to start a function of the image forming apparatus, for example, and a plurality of push buttons allowing an operator to directly enter a command to start a function of the image forming apparatus, for example.

Japanese Patent Laid-Open No. 9-269860 describes a configuration of an operation panel including push buttons. The push buttons are integrally formed with a common supporting bar with arms therebetween, and the common supporting bar is screwed or welded to a case of an operation unit. The push buttons and the arms form a hinge structure having the common supporting bar as a shaft. The arms are formed of an elastic material. The operation panel further includes, at positions below the push buttons, switches configured to move together with the push buttons for key input and a printed board having the switches and an electrical circuit thereon.

However, the arm of the operation panel known in the art extends in a planar direction along a pressing surface of the push button. To reduce force required to push the push button, the arm is required to have lower elastic force by having a longer length or a smaller thickness, for example. This requires a space extending along the pressing surface of the push button in a planar direction to be larger. The thickness of the operation panel increases if the above-described push button is disposed at a side surface of the operation panel.

SUMMARY OF THE INVENTION

The present invention provides an operation apparatus having high operability and including a thin operation unit, and an image forming apparatus including the operation apparatus.

The present invention provides an operation apparatus for controlling an image forming apparatus configured to form an image on a recording medium. The operation apparatus includes: a side surface; an inner side; a button disposed at the side surface and configured to be moved toward the inner side; a positioning portion positioning the button; and a connector disposed adjacent to a side surface of the button. The connector has a first end connected to the positioning portion, a second end connected to the button, and a plurality of bent portions between the first and second ends. The positioning portion and the button are arranged in a height direction of the side surface. The connector and the button are adjacent to each other in a direction perpendicular to the height direction.

Further features of the present invention will become apparent from the following description of exemplary embodiments with reference to the attached drawings.

DESCRIPTION OF THE EMBODIMENTS

First Embodiment

Hereinafter, an embodiment of the present invention is described in detail with reference to the drawings.

Figure 1:
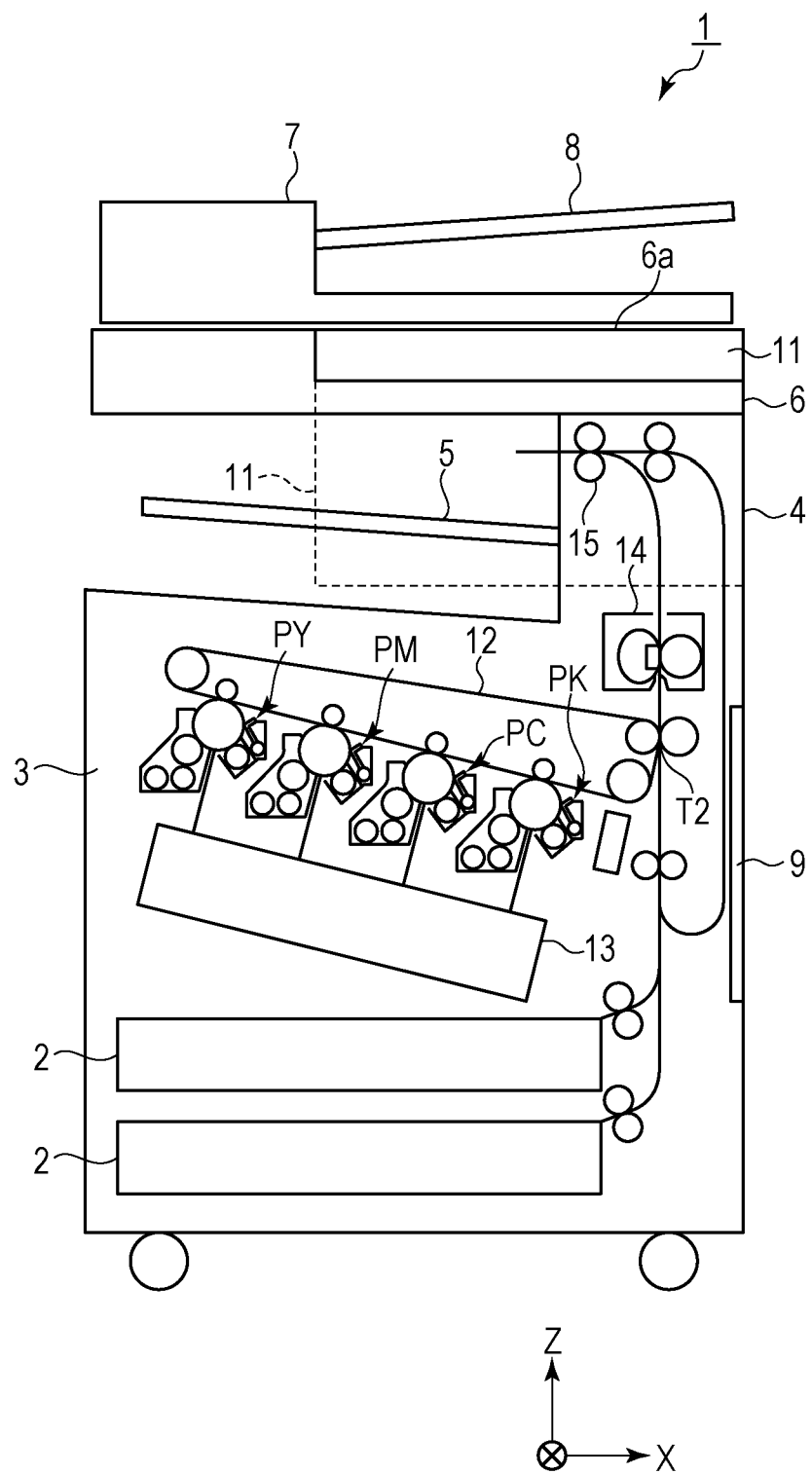
FIG. 1 is a view illustrating a configuration of an image forming apparatus according to an embodiment of the present invention.
Figure 2:
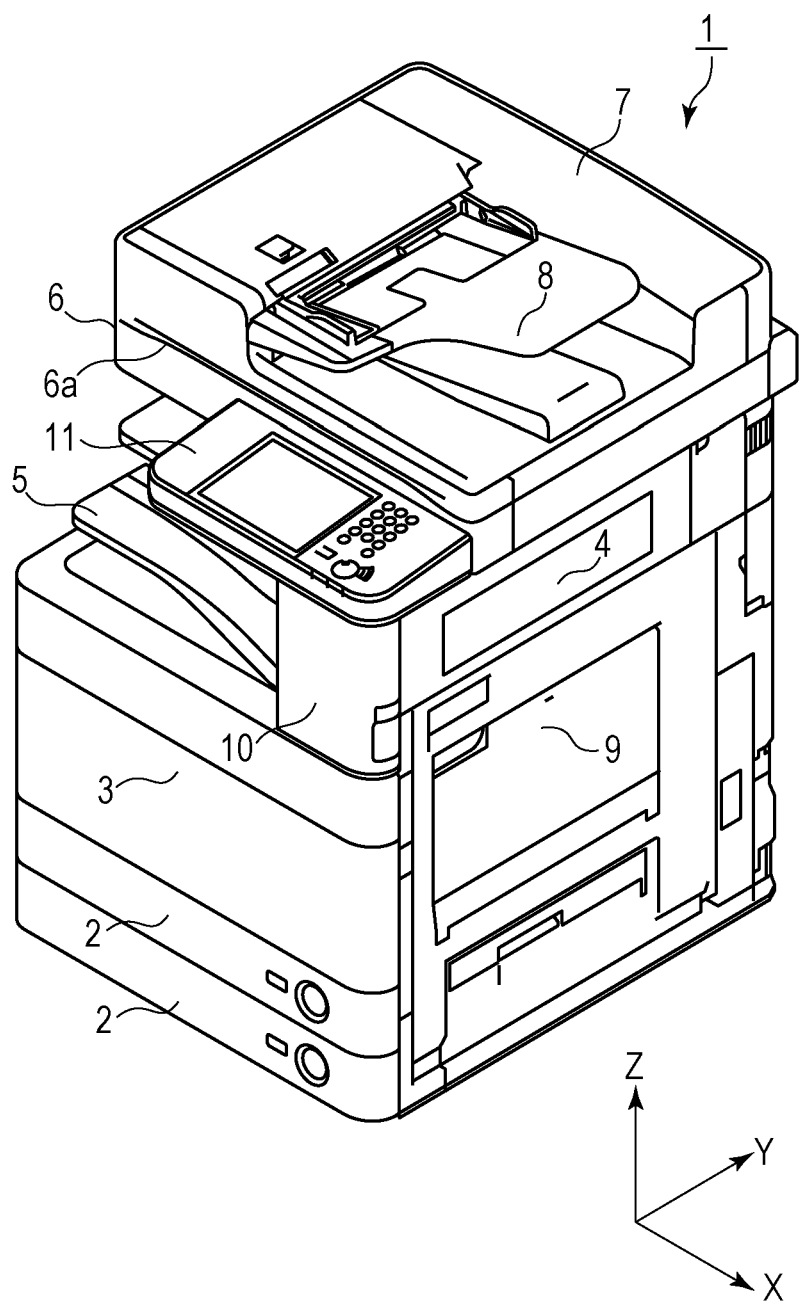
FIG. 2 is a perspective view illustrating the image forming apparatus according to the embodiment of the present invention.

FIG. 1 is a view illustrating a configuration of an image forming apparatus according to a first embodiment. FIG. 2 is a perspective view illustrating the image forming apparatus according to the first embodiment. The X, Y, and Z coordinate system in FIG. 1 and the other figures indicate the orientation of the image forming apparatus. Specifically, the X axis indicates a width direction of the image forming apparatus, an arrow direction of the X axis indicates a rightward direction as seen from the front surface of the image forming apparatus, and a direction opposite to an arrow direction indicates a leftward direction as seen from the front surface of the image forming apparatus. The Y axis indicates a front-rear direction of the image forming apparatus, an arrow direction of the Y axis indicates a rearward direction as seen from the front surface of the image forming apparatus, and a direction opposite to the arrow direction indicates a frontward direction as seen from the front surface of the image forming apparatus. In this embodiment, the front surface of the image forming apparatus faces the direction opposite to the arrow direction of the Y axis. The Z axis indicates the height direction of the image forming apparatus, an arrow direction of the Z axis indicates an upward direction, and a direction opposite to the arrow direction indicates a downward direction. In addition, the symbol ◯ indicates a tip of the arrow of the X, Y, or Z axis, and the symbol x in the symbol ◯ indicates a rear end of the arrow of the X, Y, or Z axis. In this embodiment, the front surface of the image forming apparatus directly faces an operator using an operation unit.

As illustrated in FIG. 1, the image forming apparatus 1 according to the first embodiment is a full-color tandem multifunction device including image forming sections PY, PM, PC, and PK arranged along an intermediate transfer belt 12.

The image forming sections in this embodiment each include a photosensitive drum as an image carrier, a charging member configured to charge the photosensitive drum, a developer configured to develop an electrostatic latent image on the photosensitive drum, and a cleaner configured to remove toners remaining in the photosensitive drum after the image transfer. An exposure apparatus 13 configured to form the electrostatic latent image on the photosensitive drum is disposed below the intermediate transfer belt 12 in this embodiment.

In the image forming section PY in a body 3, a yellow toner image is formed and is primarily transferred onto the intermediate transfer belt 12. In the image forming section PM, a magenta toner image is formed and is primarily transferred onto the yellow toner image on the intermediate transfer belt 12. In the image forming sections PC and PK, a cyan toner image and a black toner image are formed, respectively, and are sequentially primarily transferred onto the corresponding toner images on the intermediate transfer belt 12.

The toner images in four colors on the intermediate transfer belt 12 are transported to a second transfer section T2 and are secondarily transferred onto a recording medium P placed on a portion of the intermediate belt 12 passing through a narrow gap in the second transfer section T2. The recording medium P to which the toner image is secondarily transferred at the second transfer section T2 is heated under pressure at a fixing unit 14 housed in a vertical path 4 such that the toner image is fixed on the surface, and then is ejected to an ejection tray 5 by ejection rollers 15.

Paper cassettes 2 are disposed at a lower section of the body 3 in such a way that the paper cassettes 2 can be drawn out to the front side. The recording medium P, which is taken out one by one from the paper cassette 2, stands by right before the second transfer section T2, and is sent out to the second transfer section T2 such that the recording medium P arrives at the right time to receive the toner images on the intermediate transfer belt 12.

An image scanning portion 6 (flatbed scanner) is disposed above the body 3 with the vertical path 4 disposed therebetween. The image scanning portion 6 is configured to optically scan an image on a lower surface of a document placed on a scanning surface (glass plate) and convert the image into image data. A document is placed on the scanning surface 6a while an automatic document feeder (ADF) 7 is lifted up. The automatic document feeder 7 feeds documents on a document tray 8 one page at a time and passes the document through the scanning surface. The image scanning portion 6 reads the document passing therethrough.

An operation unit 11 is disposed at substantially the same height as the image scanning portion 6 and has an operation surface facing upward (in the Z direction). The vertical path 4 positioned directly below the operation unit 11 houses a transport mechanism, various sensors, and a fan, for example. The transport mechanism, which includes the ejection rollers 15, is configured to transport the recording medium P. The ejection tray 5, which is an example of a loading portion, is disposed between the body 3 and the image scanning portion 6. The recording medium P on the ejection tray 5 is removed from the front side after the image is formed thereon in the body 3.

As illustrated in FIG. 2, the operation unit 11 is positioned below the scanning surface 6a of the image scanning portion 6 and in front of the image scanning portion 6. A vertical path cover 10 is disposed below the operation unit 11 so as to cover the vertical path 4, which is disposed upstream of the ejection tray 5.

In an automatic scanning mode, a document is placed on the document tray 8 of the automatic document feeder 7. In a manual scanning mode, the automatic document feeder 7 is lifted upward so as to allow access to the scanning surface 6a of the image scanning portion 6. The top of the operation unit 11 is positioned below the scanning surface 6a such that accessibility of the document to the scanning surface 6a does not deteriorate.

Then, after the document is placed on the document tray 8 (or the scanning surface 6a of the image scanning portion 6) of the automatic document feeder 7, information such as a scanning mode, i.e., a black-and-white scanning mode or a color scanning mode, an output copy size, a type of the recording medium, or the number of copies to print, for example, is input through the operation unit 11.

The image scanning portion 6 scans an image on the document based on the information input through the operation unit 11. Then, the recording medium P in the paper cassette 2 or on a manual feed tray 9 in an open state is fed, and an image is formed on the recording medium P in the body 3. The recording medium P after the image formation is ejected onto the ejection tray 5 through the vertical path 4.

Next, a configuration of the operation unit 11, which characterizes the present invention, is described with reference to FIG. 3 to FIG. 13.

Figure 3:
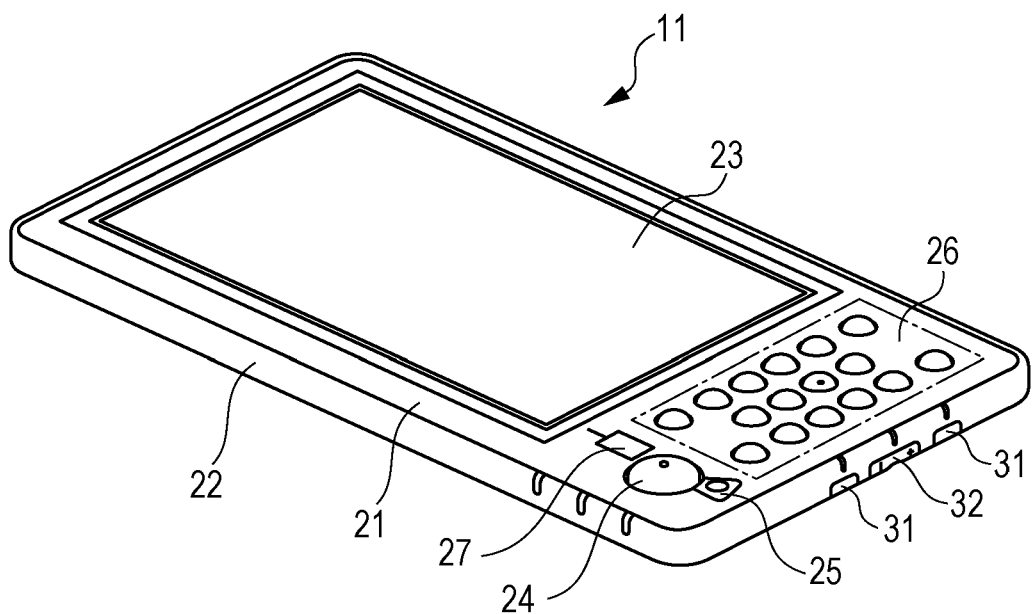
FIG. 3 is a perspective view illustrating an operation unit according to the embodiment of the present invention.
Figure 4:
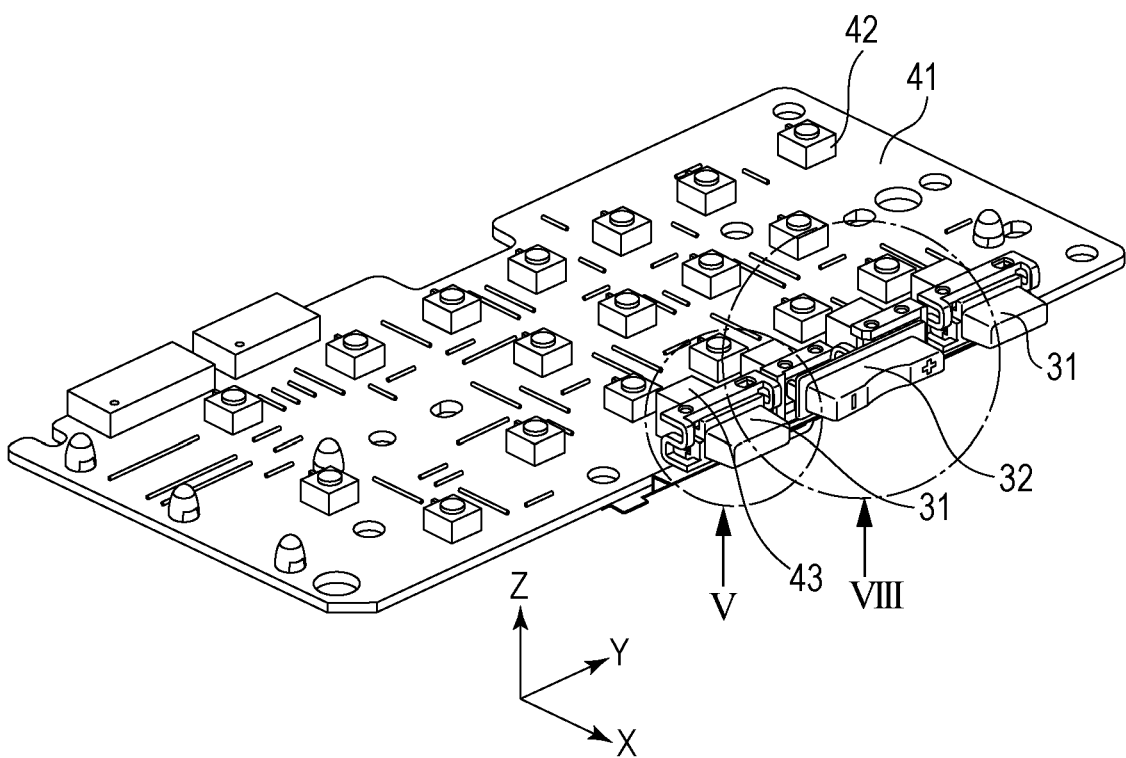
FIG. 4 is a perspective view illustrating the main components of side keys and the surrounding portions according to the embodiment of the present invention.
Figure 5:
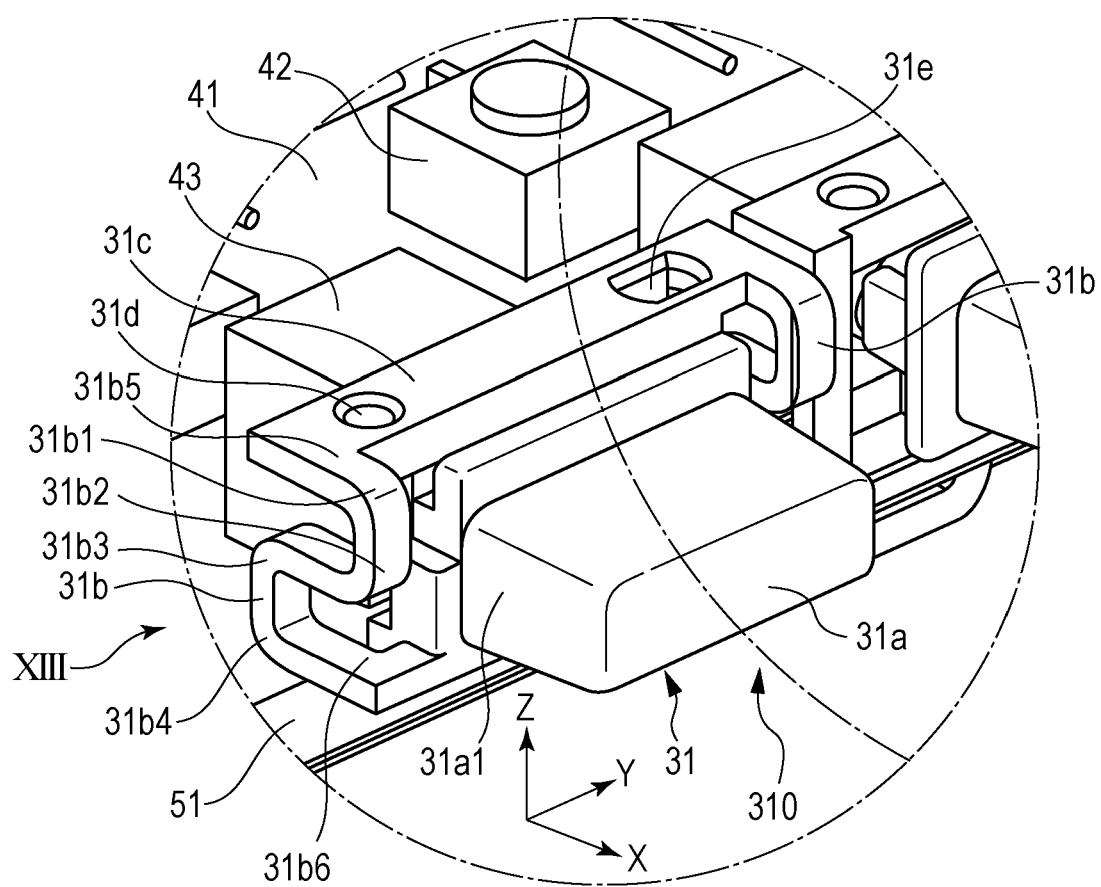
FIG. 5 is a magnified perspective view illustrating the main components of a single stage side key and the surrounding portions according to the embodiment of the present invention.
Figure 6:
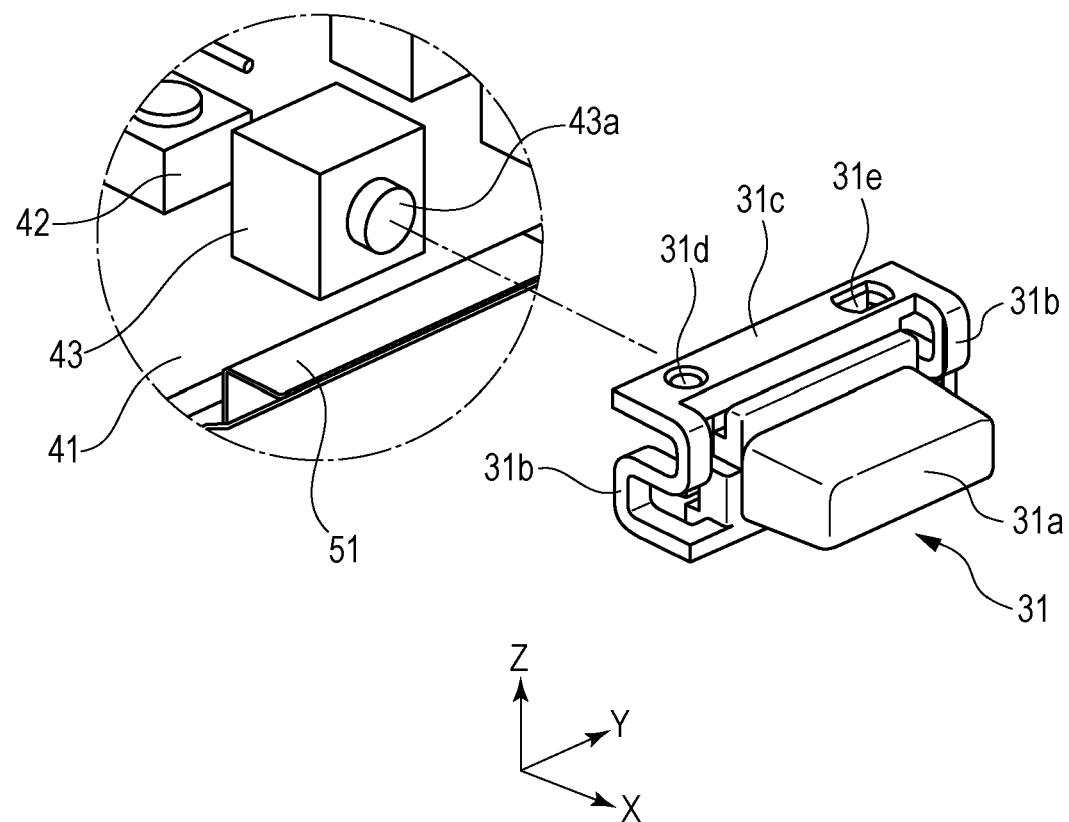
FIG. 6 is an exploded perspective view mainly illustrating a right side of the single stage side key according to the embodiment of the present invention viewed from the upper right relative to a front side of the image forming apparatus.
Figure 7:
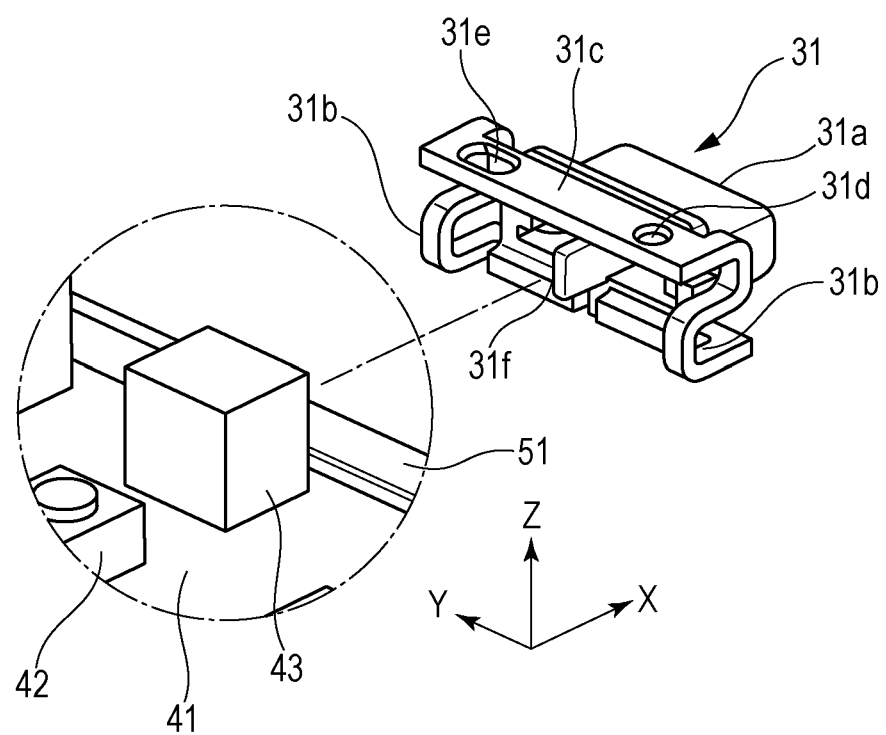
FIG. 7 is an exploded perspective view mainly illustrating a left side of the single stage side key according to the embodiment of the present invention viewed from the upper left relative to the front side of the image forming apparatus.
Figure 8:
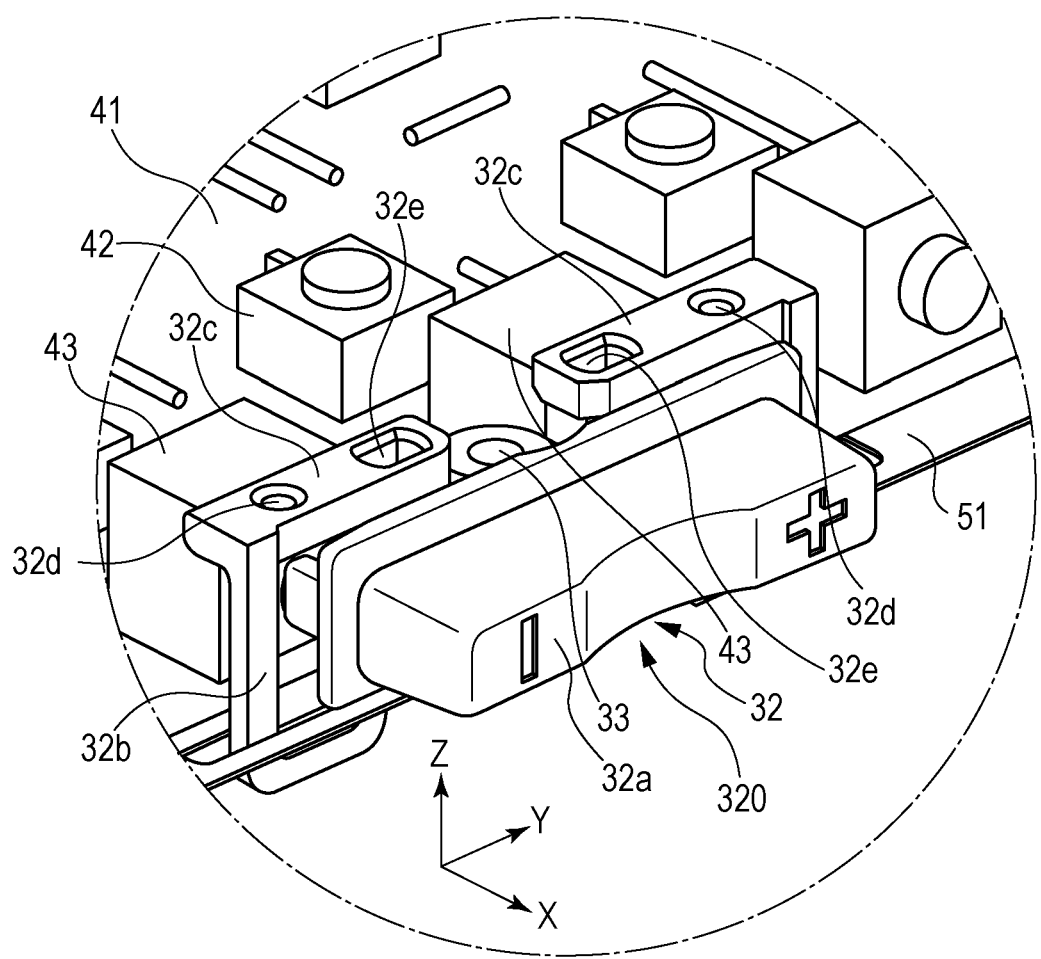
FIG. 8 is a magnified perspective view illustrating the main components of a multistage side key and the surrounding portions according to the embodiment of the present invention.
Figure 9:
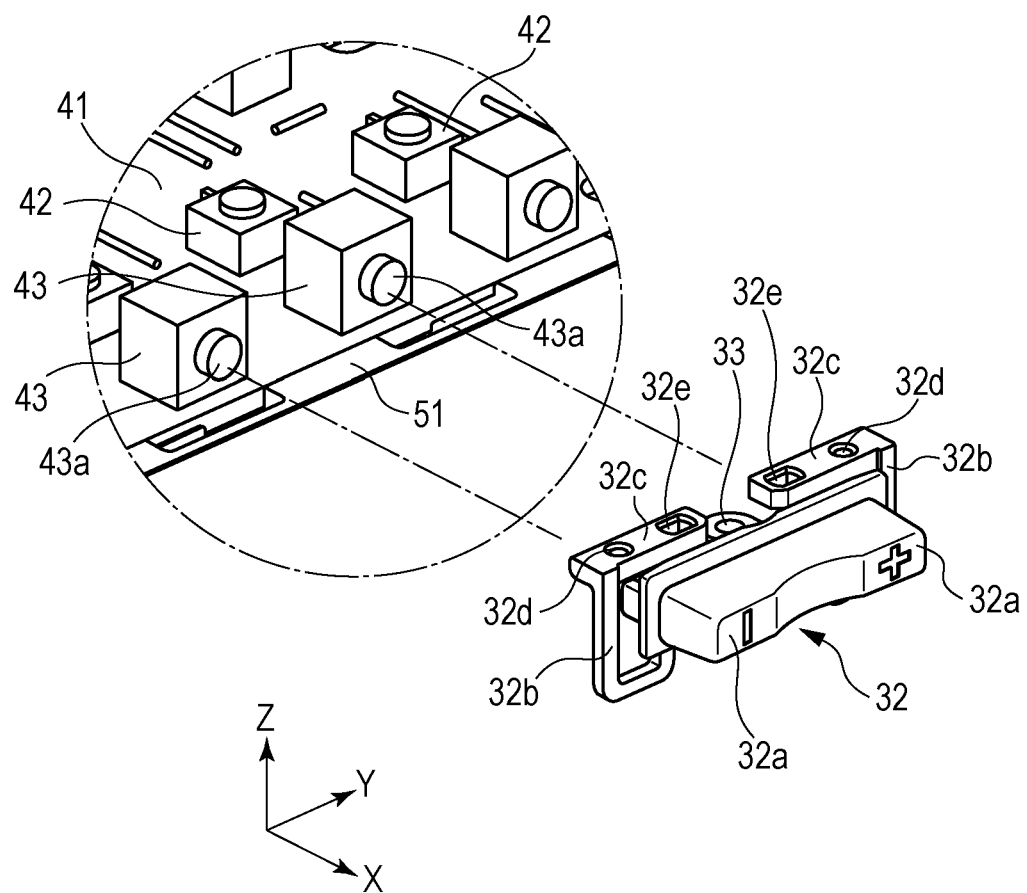
FIG. 9 is an exploded perspective view mainly illustrating a right side of the multistage side key according to the embodiment of the present invention viewed from the upper right relative to the front side of the image forming apparatus.
Figure 10:
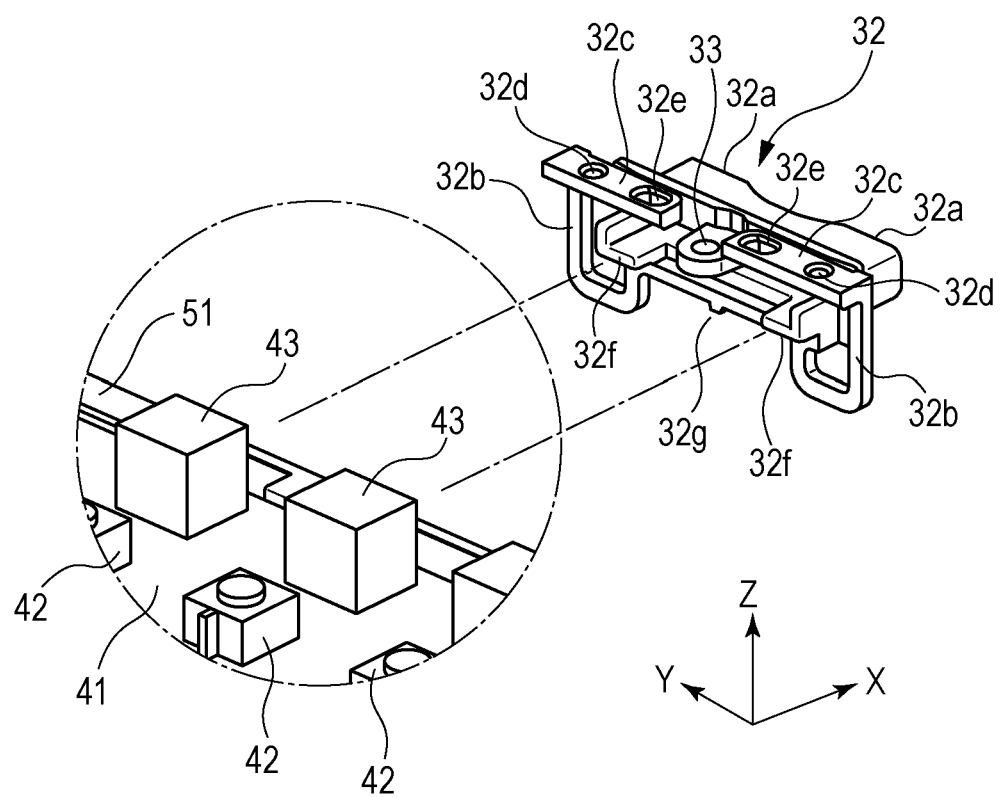
FIG. 10 is an exploded perspective view mainly illustrating a left side of the multistage side key according to the embodiment of the present invention viewed from the upper left relative to the front side of the image forming apparatus.

FIG. 3 is a perspective view of the operation unit 11. FIG. 4 is a perspective view illustrating the main components of a single stage side key, which is a push button, and the surrounding portions. FIG. 5 is a magnified perspective view illustrating the main components of the single stage side key and the surrounding portions. FIG. 6 is an exploded perspective view mainly illustrating a right side of the single stage side key viewed from the upper right relative to the front side of the image forming apparatus. FIG. 7 is an exploded perspective view mainly illustrating a left side of the single stage side key viewed from the upper left relative to the front side of the image forming apparatus. In addition, FIG. 8 is a magnified perspective view illustrating the main components of a multistage side key and the surrounding portions. FIG. 9 is an exploded perspective view mainly illustrating a right side of the multistage side key viewed from the upper right relative to the front side of the operation unit. FIG. 10 is an exploded perspective view mainly illustrating a left side of the multistage side key viewed from the upper left relative to the front side of the image forming apparatus.

FIG. 3 is a perspective view of the operation unit 11. In FIG. 3, a front cover 21 having a substantially planar surface, which provides the upper surface of the operation unit 11, and a side cover 22 having a frame shape, which provides side surfaces of the operation unit 11 provide an external appearance of the operation unit 11. In addition, the operation unit 11 includes a liquid crystal display 23 having a display function designed to display an operational state of the image forming apparatus 1 and a touch panel function designed to be used instead of keys described later, in substantially the same plane as the front cover 21. The operation unit 11 further includes a start key 24 for starting an image forming operation such as copying, a stop key 25 for stopping the image forming operation, number and alphabet keys 26 for inputting the number of copies to print, facsimile number, or e-mail address, for example, and a reset key 27 for resetting the set condition. In addition, the operation unit 11 includes at least one single stage side key 31, which is used to check the number of pages printed or the information about the apparatus, and at least one multistage side key 32, which is used to adjust brightness of the liquid crystal display 23, at the right surface.

FIG. 4 illustrates the main components of the push buttons and the surrounding components. FIG. 5 is a magnified view of a portion indicated by the symbol V in FIG. 4. FIG. 4 and FIG. 5 illustrate the single stage side key(s) 31 in the form of push button, the multistage side key 32 in the form of a multistage push button, and a printed board 41 including an electrical circuit for converting the information input through the push buttons into electrical signals. In addition, a supporting member 51 supporting a lower portion of each of the single stage side keys 31 and the multistage side key 32 is illustrated. The supporting member 51, which is described below, is screwed or swaged, for example, to a reinforcement stay 52 (see FIG. 13) having an area substantially equal to a projection area of the operation unit 11 for imparting strength to the operation unit 11.

The printed board 41 is positioned substantially parallel to the upper surface of the front cover 21 and is directly fixed to the rear surface of the front cover 21 with a screw, for example (not illustrated). In addition, planer switches 42 through which an electric current passes in conjunction with the input by the push buttons such as the start key 24 and the stop key 25 on the upper surface of the operation unit 11 are disposed on the upper surface of the printed board 41. The planar switches 42 each have an input surface as an upper surface. In addition, side switches 43 through which an electric current passes in conjunction with the input by the single stage side key 31 and the multistage side key 32, which are disposed at the right surface of the operation unit 11, are disposed on the right end of the printed board 41. The side switches 43 each has an input surface as the right surface.

The side switch 43 and the single stage side key 31 are described with reference to FIG. 5. The side switch 43 is disposed on the right end of the printed board 41. An electric current passes through the side switch 43 in conjunction with the input by the single stage side key 31 or the multistage side key 32 disposed at the right surface. The input surface of the side switch 43 serves as the right surface. The single stage side key 31 of the present embodiment includes a button 310 having a rectangular cuboidal shape and two arms 31b positioned on lateral ends of the button 310. The single stage side key 31 is pushed by an operator at an operation surface 31a. The operation surface 31a is a portion of the surface of the button (pressing portion) 310 to be pushed by an operator. The button 310 moves in a direction substantially perpendicular to the operation surface 31a when an operator pushes the operation surface 31a. In this embodiment, the operation surface 31a extends substantially parallel to the side surface of the operation unit 11. Two arms 31b are disposed alongside surfaces 31a1 extending from each lateral end of the operation surface 31a. In this embodiment, the arms 31b each have an S-like shaped portion when viewed from the side of the side surface 31a1. The arms 31b are arranged in the Y direction with the operation surface 31a disposed therebetween and positioned on the rear (left side) of the operation surface 31a. The single stage side key 31 includes a front cover securing portion 31c, which functions as a positioning portion positioning the single stage side key 31 in the operation unit 11. The front cover securing portion 31c connects the arms 31b to each other and limits the position of the arms 31b in the height direction with respect to the front cover 21. The arms 31b function as a connector connecting the button 310 having the operation surface 31a with the front cover securing portion 31c. The operation surface 31a, the arms 31b, and the front cover securing portion 31c are an integrally formed component. The arms 31b each have a plurality of bent portions. Specifically, the arms 31b each have an S-like shaped portion or an inverted S-like shaped portion having bent portions 31b1, 31b2, 31b3, and 31b4 in side view. In this embodiment, a connecting portion 31b5 connecting an end of the arm 31b with the front cover securing portion 31c and a connecting portion 31b6 connecting another end of the arm 31b with the button 310 having the operation surface 31a are arranged in the Z direction. Specifically, the connecting portion 31b5 and the connecting portion 31b6 are arranged in a planar direction of the side surface 31a1. In an overall view of the operation unit 11, the arms 31b are each attached such that the connecting portion 31b5 and the connecting portion 31b6 are arranged in the thickness direction of the operation unit 11. The front cover securing portion 31c includes a fitting hole 31d and a long fitting hole 31e for positioning the single stage side key 31 with respect to the front cover 21 in the planar direction.

FIG. 6 is an exploded perspective view mainly illustrating a right side of the single stage side key 31 and a right side of the side switch 43 corresponding to the single stage side key 31 viewed from the upper right relative to the front surface of the image forming apparatus 1. FIG. 7 is an exploded perspective view mainly illustrating a left side of the single stage side key 31 and the side switch 43 corresponding to the single stage side key 31 viewed from the upper left relative to the front surface of the image forming apparatus 1. As illustrated in FIG. 6 and FIG. 7, the single stage side key 31 integrally includes the operation surface 31a as the right surface and an input protrusion 31f. The input protrusion 31f, which faces an input surface 43a of the side switch 43, extends from a substantially middle of a rear surface of the operation surface 31a. In this configuration, the input surface 43a of the side switch 43 is pushed by the input protrusion 31f of the single stage side key 31 when the operation surface 31a of the single stage side key 31 is pushed.

The multistage side key 32 is described with reference to FIG. 8, FIG. 9, and FIG. 10.

FIG. 8 is a magnified view of a portion indicated by a symbol VIII in FIG. 4. The multistage side key 32 includes an operation surface 32a having the character (e.g., a plus sign) thereon at an end and an operation surface 32a having the character "–" (e.g., a minus sign) thereon at another end. A button 320 having a rectangular cuboidal shape includes the operation surfaces 32a. Arms 32b as connectors each having a substantially U-shape are disposed outwardly of the operation surfaces 32a in a planar direction (front-rear direction) on the rear of the operation surfaces 32a (on the inner side of the operation unit 11). In addition, the multistage side key 32 includes two front cover securing portions 32c as positioning portions for positioning the multistage side key 32 in the height direction with respect to the front cover 21. The front cover securing portions 32c are connected to the arms 32b. In this embodiment, the button 320, the arms 32b, and the front cover securing portions 32c are an integrally formed component. In addition, the front cover securing portions 32c each have a fitting hole 32b and a long fitting hole 32e for restricting the position of the multistage side key 32 with respect to the front cover 21 in the planar direction. In addition, a fitting hole 33 is disposed on substantially the center between rear surfaces of the two operation surfaces 32a. The multistage side key 32 turns about the fitting hole 33 in the planar direction. A boss on the front cover 21, which is not illustrated, fits in the fitting hole 33 to rotatably support the multistage side key 32.

FIG. 9 is an exploded perspective view mainly illustrating a right side of the multistage side key 32 and the side switches 43 corresponding to the multistage side key 32 viewed from the upper right relative to the front surface of the image forming apparatus 1. FIG. 10 is an exploded perspective view mainly illustrating a left side of the multistage side key 32 and the side switches 43 corresponding to the multistage side key 32 viewed from the upper left relative to the front surface of the image forming apparatus 1. As illustrated in FIG. 10, the multistage side key 32 integrally includes two input protrusions 32f each having a substantially L shape on the rear surface of each of the two operation surfaces 32a, which are the right surfaces. The input protrusions 32f face corresponding input surfaces 43a of the side switches 43. In this configuration, the multistage side key 32 turns about the fitting hole 33 as described above when one of the operation surfaces 32a of the multistage side key 32 is pushed. Then, the input protrusion 32f of the multistage side key 32 corresponding to the pushed one of the operation surfaces 32a pushes the input surface 43a of the side switch 43 facing the input protrusion 32f.

Figure 11:
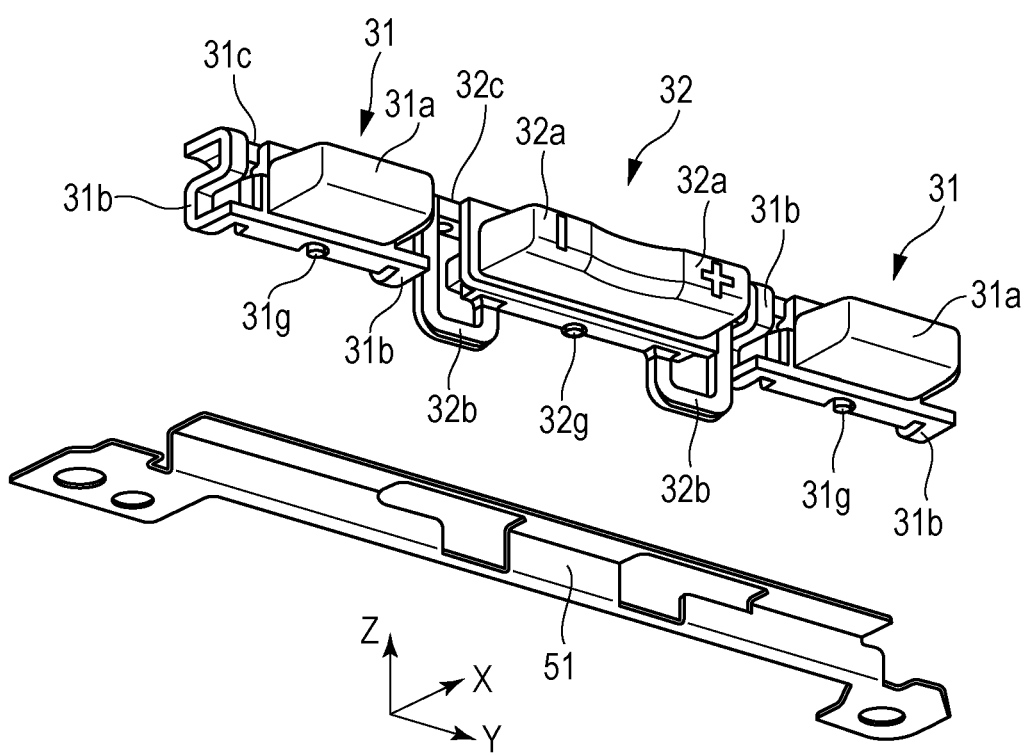
FIG. 11 is an exploded perspective view illustrating how the side keys according to the embodiment of the present invention are supported.
Figure 12:
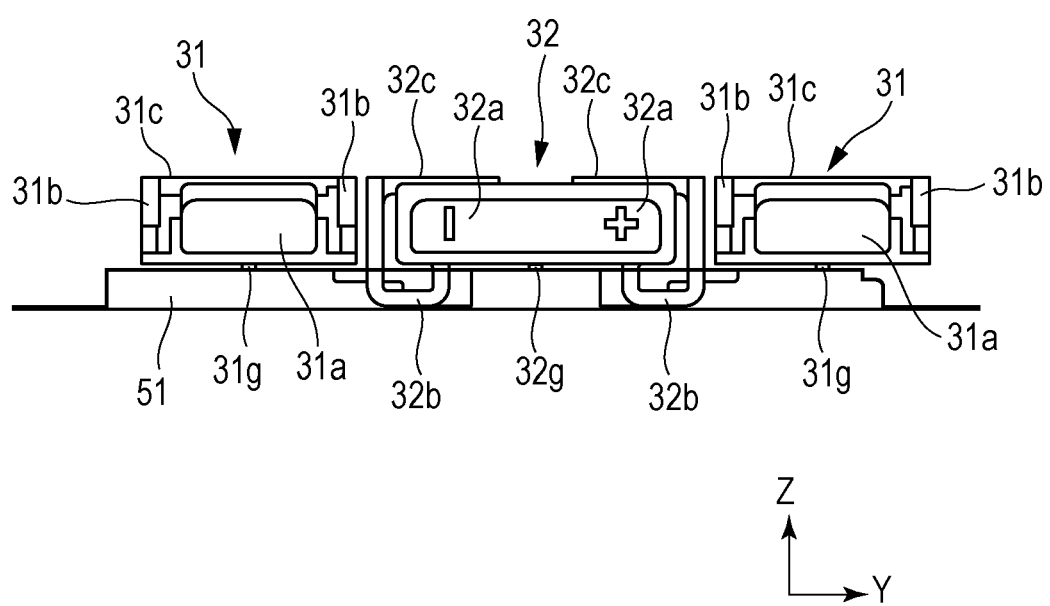
FIG. 12 is a plane view illustrating how the side keys according to the embodiment of the present invention are supported.

FIG. 11 is an exploded perspective view illustrating how lower portions of the single stage side keys 31 and the multistage side key 32 are supported. FIG. 12 is a right-side plane view illustrating how the single stage side keys 31 and the multistage side key 32 are supported. As illustrated in FIG. 11, the single stage side keys 31 each include a supporting protrusion 31g, which is integrally formed with the button 310, on the bottom surface at a position corresponding to substantially the center of the operation surface 31a. In addition, the multistage side keys 32 each include a supporting protrusion 32g, which is integrally formed with the button 320, on the bottom surface at a position corresponding to substantially the center of the two operation surfaces 32a. As illustrated in FIG. 12, the supporting protrusions 31g of the single stage side keys 31 and the supporting protrusion 32g of the multistage side key 32 are in contact with an upper surface of the supporting member 51, which is formed of a conductive metal thin plate and fastened to a reinforcing stay 52 (see FIG. 13). The supporting member 51 which is formed of a metal thin plate has elasticity. The supporting member 51 disposed on an opposite side of the push buttons 310 and 320 from the front cover securing portions 31c and 32c prevents the single stage side keys 31 and the multistage side key 32 from falling down under their own weight. In this embodiment, the supporting protrusions 31g and 32g are each in contact with the supporting member 51, and not fixed to the supporting member 51.

Figure 13:
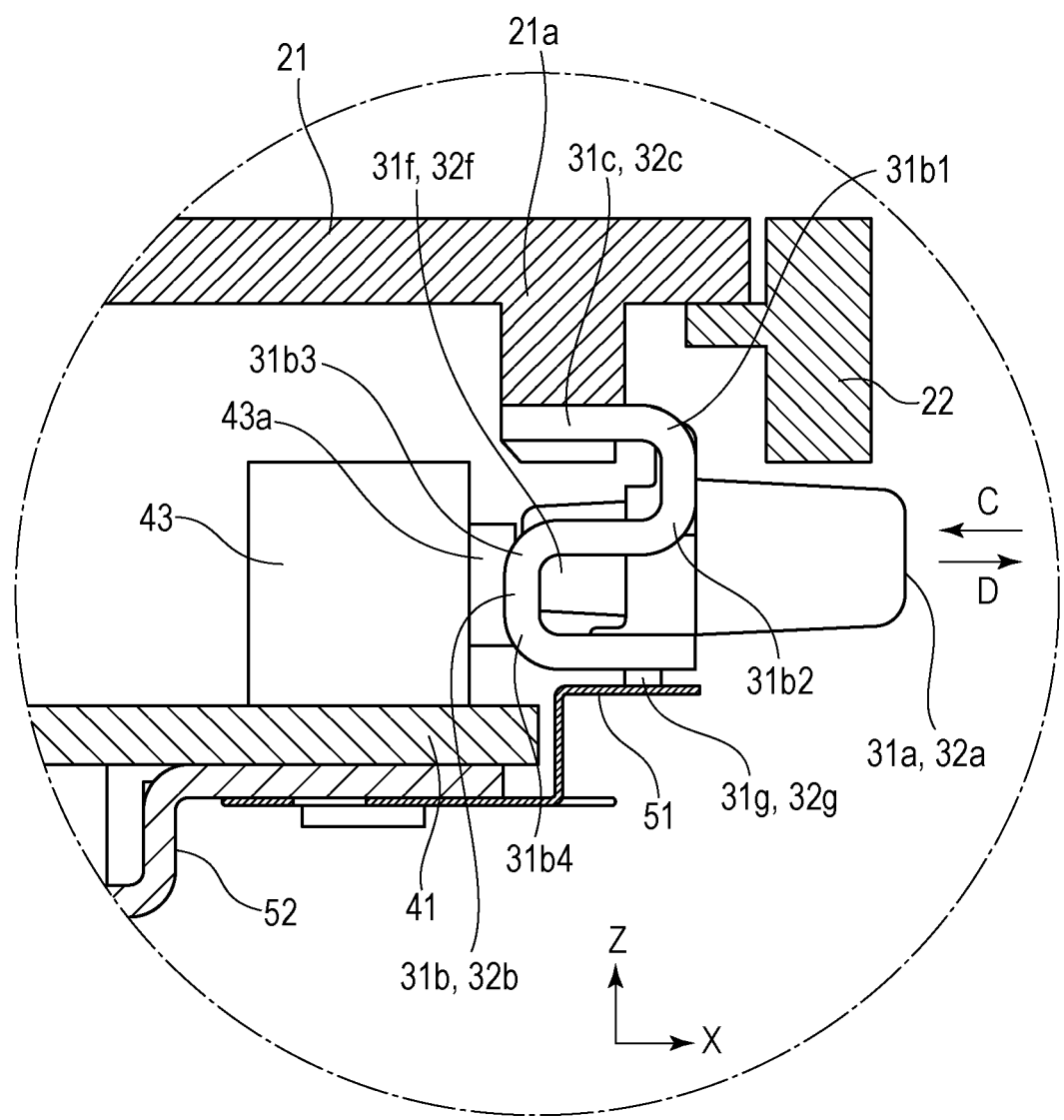
FIG. 13 is a cross-sectional view illustrating the single stage side key and the surrounding portions according to the embodiment of the present invention.

With reference to FIG. 13, the surrounding portions of the single stage side key 31 and the multistage side key 32 are described by using the single stage side key 31 as an example.

FIG. 13 is a cross-sectional view of a portion viewed in a direction of an arrow XIII in FIG. 5 and illustrates the single stage side key 31 and the surrounding portions. As illustrated in FIG. 13, an upper surface of the front cover securing portion 31c of the single stage side key 31 is in contact with a lower surface of a side key supporting portion 21a integrally extending from a lower surface of the front cover 21. In other words, in this embodiment, the front cover securing portion 31c is positioned closer than the button 310 to the upper surface of the operation unit 11, the button 310 is positioned at the side surface of the operation unit 11, and the supporting member 51 is positioned closer than the button 310 to the lower surface of the operation unit 11. The supporting protrusion 31g of the single stage side key 31 is in contact with the upper surface of the supporting member 51. The supporting member 51 is fixed in the operation unit 11. The supporting member 51 is fixed at the installation location. An end of the supporting member 51 is fixed to the operation unit 11 and another end thereof is a free end such that the supporting member 51 has elasticity. The free end of the supporting member 51 is in contact with the supporting protrusion 31g. Thus, the single stage side key 31 is sandwiched between the side key supporting portion 21a of the front cover 21 and the supporting member 51 in the height direction. The lower surface of the side key supporting portion 21a of the front cover 21 integrally includes two bosses, which are not illustrated. One of the bosses fits in the fitting hole 31d of the single stage side key 31 and the other of the bosses fits in the long fitting hole 31e of the single stage side key 31. This configuration restricts the position of the single stage side key 31 in the height direction (thickness direction or Z direction) and the X-Y plane direction in the operation unit 11.

The operation surface 32a, the arms 32b, the front cover securing portion 32c, the fitting hole 32d, the long fitting hole 32e, the input protrusion 32f, and the supporting protrusion 32g of the multistage side key 32 each corresponding to the operation surface 31a, the arm 31b, the front cover securing portion 31c, the fitting hole 31d, the long fitting hole 31e, the input protrusion 31f, and the supporting protrusion 31g of the single stage side key 31, respectively. The multistage side key 32 and the single stage side key 31 have the same configuration except that the multistage side key 32 is configured to turn about the fitting hole 33 in a planar direction and the arm 32b of the multistage side key 32 has a different configuration from that of the single stage side key 31. The position of the multistage side key 32 in the height direction and the planar direction is restricted in the same way as the single stage side key 31.

The movement of the above-described configuration is described with reference to FIG. 13 by using the single stage side key 31 as an example.

When the operation surface 31a of the single stage side key 31, which is disposed at the right surface of the operation unit 11, is pushed in a direction indicated by an arrow C (leftward), a portion of the single stage side key 31 on a side of the front cover securing portion 31c remains supported and fixed by the side key supporting portion 21a of the front cover 21. A portion of the single stage side key 31 on a side of the supporting member 51, which is movable against the elastic force of the supporting member 51 and the arm 31b, is tilted in the pressing direction, although the supporting protrusion 31g is substantially in contact with the upper surface of the supporting member 51 formed of a metal thin plate. Then, the input protrusion 31f of the single stage side key 31 pushes the input surface 43a of the side switch 43. When the pressure applied to the single stage side key 31 is released, the single stage side key 31 in which the lower portion is tilted in the pressing direction returns in a direction indicated by an arrow D (rightward) due to the elastic force of the arm 31b. In addition to this, since the supporting protrusion 31g is substantially in contact with the supporting member 51, the height position of the single stage side key 31 is restricted and the single stage side key 31 does not rattle. Since the supporting protrusion 31g is disposed at a position corresponding to substantially the center of the operation surface 31a (see FIG. 12), ends of the single stage side key 31 in the width direction (front-rear direction) are unlikely to be tilted.

As in the single stage side key 31, in the multistage side key 32, the front cover securing portion 32c is fixed to a securing portion of the front cover 21, which is not illustrated, and the supporting protrusion 32g is in contact with the supporting member 51 formed of a metal thin plate such that the multistage side key 32 is sandwiched between the front cover 21 and the supporting member 51. Thus, the height position of the multistage side key 32 is restricted, and the multistage side key 32 does not rattle. In addition, since the supporting protrusion 32g is positioned substantially the center of the two operation surfaces 32a (see FIG. 12), ends of the multistage side key 32 in the width direction (front-rear direction) are unlikely to be tilted.

As described above, the single stage side key 31 and the multistage side key 32 are tilted in the pressing direction when pushed. Then, when the pressure applied to the single stage side key 31 and the multistage side key 32 is released, the single stage side key 31 and the multistage side key 32 return to the original positions due to the elastic force of each of the single stage side key 31, the multistage side key 32, and the supporting member 51 formed of a metal thin plate supporting the side keys in the height direction. Thus, the single stage side key 31 and the multistage side key 32 do not rattle. This improves the operability.

In addition, since the supporting member 51 formed of a metal thin plate supports a portion of each of the single stage side key 31 and the multistage side key 32 in the height direction, the single stage side key 31 and the multistage side key 32 are able to have a low height, enabling the operation unit 11 to have a small thickness.

In addition, in the above-described configuration, the supporting member 51 formed of a metal thin plate supports a portion of each of the single stage side key 31 and the multistage side key 32 in the height direction. This enables the supporting member 51 to reliably support the single stage side key 31 and the multistage side key 32 with its elastic force even if the single stage side key 31, the multistage side key 32, and the surrounding portions are varied in height. This improves an external appearance of the single stage side key 31, the multistage side key 32, and the surrounding portions.

In addition, since the supporting member 51 is formed of a metal thin plate, static electricity in an operator is discharged to the ground through the supporting member 51 formed of a metal thin plate when the operator pushes the single side key 31 or the multistage side key 32. Thus, the single stage side key 31 and the multistage side key 32 are unlikely to be electrically charged.

Second Embodiment

In the first embodiment, the single stage side key 31 includes the arms 31b each having an S-like shaped portion in side view. However, the shape of the arm 31b in side view may be changed as long as the space of the operation unit 11 in the height direction and the pressing direction can accommodate the arm 31b. The arm 31b may have one additional bent portion, or two additional bent portions so as to form a stacked double S shape, for example. The arm 31b having the modified configuration provides the same advantages.

Figure 14:
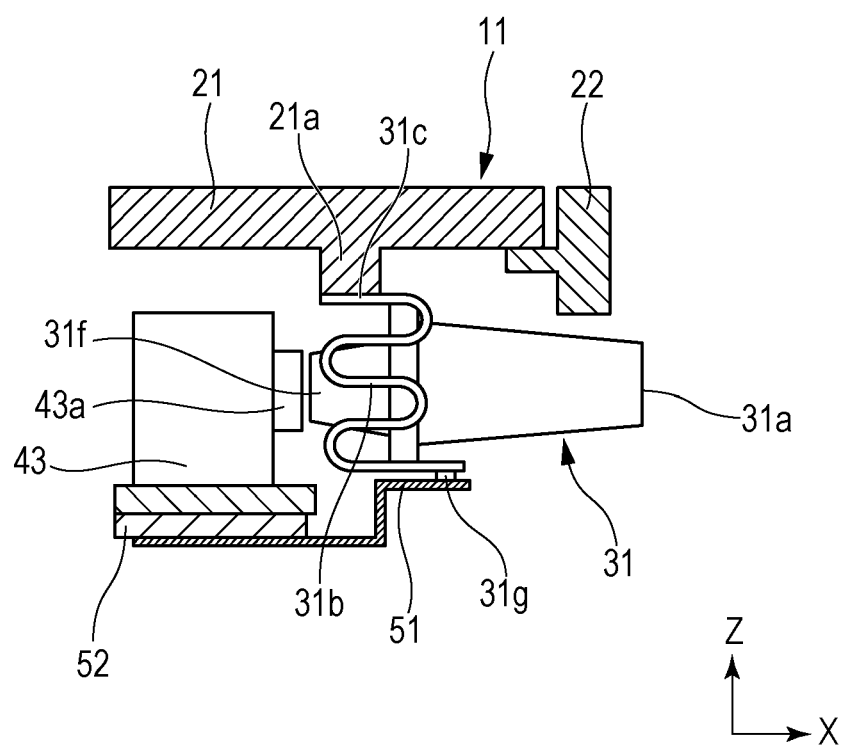
FIG. 14 is a cross-sectional view illustrating a push button and the surrounding portions according to a second embodiment of the present invention.

FIG. 14 is a cross-sectional view illustrating a single stage side key 31 and the surrounding portions according to a second embodiment. In FIG. 14, which corresponds to FIG. 13 illustrating the first embodiment, components identical to those in the first embodiment are assigned the same reference numerals as those in the first embodiment. As illustrated in FIG. 14, the single stage side key 31 includes an arm 31b having a double S shape in which two S-like shaped portions are stacked in the height direction in side view. This configuration decreases the elastic force of the arm 31b and lowers the spring constant, reducing the force required for an operator to push the single stage side key 31.

As described in the above-described embodiments, the configuration described in the embodiments enables the operation unit 11 to have a small thickness since the arm 31b of the single stage side key 31 is positioned on the rear side of the operation surface 31a (in a direction perpendicular to the operation surface 31a). In addition, the configuration described in the embodiments enables the arm 31b of the single stage side key 31 to be positioned on the rear of the operation surface 31a with a greater degree of freedom.

In the above-described embodiments, the arm 31b is disposed at each lateral side of the button 310. However, the arm 31b may be disposed at each vertical side of the button 310 (upper and lower sides of the operation unit 11). Such configuration also reduces the area occupied by the push button.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-151200, filed Jul. 30, 2015 and Japanese Patent Application No. 2015-151201, filed Jul. 30, 2015, which are hereby incorporated by reference herein in their entirety.

What is claimed is:

1. An operation apparatus for controlling an image forming apparatus configured to form an image on a recording medium, the operation apparatus comprising:
 a display unit provided on an upper surface of the operation apparatus;

a board;

a cover formed as an exterior and covering the upper surface and a side of the operation apparatus, the cover being configured to cover the board;

a button including a push surface and configured to be able to move in a direction from outside to inside the cover when the push surface is pushed, the push surface being located outside the cover at the side of the operation apparatus;

a positioning portion provided inside the cover and configured to position the button in relation to the cover, the positioning portion being located above the push surface in a thickness direction of the board; and a pair of arm portions configured to connect the positioning portion and the button and configured to be elastically deformable to enable the button to move, the arm portion comprising:

a first end connected to the positioning portion;

a second end connected to the button, the second end being located below the first end in the thickness direction of the board;

a bent portion between the first and second ends; and a switch mounted on the board and including an input surface to be pushed by movement of the button in a planar direction of the board due to pushing of the push surface;

wherein the button is movable in the planar direction of the board and is located below the cover and above the board in the thickness direction of the board, and wherein the push surface is provided between the pair of arm portions in a direction perpendicular to a moving direction of the button and the thickness direction of the board when the push surface is viewed in the moving direction of the button.

2. The operation apparatus according to claim 1, wherein the arm portion is disposed on each end of the button in the direction perpendicular to the moving direction of the button and the thickness direction of the board.

3. The operation apparatus according to claim 1, wherein the positioning portion is fixed to the cover.

4. The operation apparatus according to claim 1,
wherein the display unit is configured to display an operation state of the image forming apparatus,
wherein the cover includes a first cover by which the upper surface of the operation apparatus is covered and a second cover by which a side surface of the operation apparatus is covered, and
wherein the positioning portion positions the button in relation to the first cover.

5. The operation apparatus according to claim 1, wherein the button, the arm portion, and the positioning portion are integrally formed.

6. The operation apparatus according to claim 1, wherein the arm portion has an S-like shaped portion or an inverted S-like shaped portion as viewed in the direction perpendicular to the moving direction of the button and the thickness direction of the board.

7. An image forming apparatus configured to form an image on a recording medium, the image forming apparatus comprising:
an image forming unit configured to form an image on a recording medium; and
the operation apparatus according to claim 1 configured to accept an operation regarding the image forming unit.

8. The operation apparatus according to claim 1, wherein the arm portion has a U-like shaped portion as viewed in the moving direction of the button.

* * * * *